United States Patent
Chen et al.

(10) Patent No.: US 7,746,918 B2
(45) Date of Patent: Jun. 29, 2010

(54) BIT SYNCHRONIZATION METHOD AND SYSTEM FOR A GPS

(75) Inventors: Jia-Yi Chen, Chiayi (TW); Ching-Piao Hung, Jhudong Township, Hsinchu County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 961 days.

(21) Appl. No.: 11/518,254

(22) Filed: Sep. 11, 2006

(65) Prior Publication Data

US 2007/0058699 A1    Mar. 15, 2007

(30) Foreign Application Priority Data

Sep. 13, 2005   (TW) .............................. 94131479 A

(51) Int. Cl.
*H04B 1/69* (2006.01)
(52) U.S. Cl. ........................ 375/145; 375/142; 375/143
(58) Field of Classification Search ................ 375/343, 375/130, 140, 340, 354, 143, 142, 150, 152, 375/145, 149; 342/350, 352, 357; 701/207, 701/213, 214, 215
See application file for complete search history.

(56) References Cited

U.S. PATENT DOCUMENTS

| 7,369,631 | B1 * | 5/2008 | Gifford et al. | 375/346 |
| 2002/0048315 | A1 * | 4/2002 | Hanada et al. | 375/145 |
| 2003/0227963 | A1 * | 12/2003 | Dafesh | 375/149 |
| 2006/0114971 | A1 * | 6/2006 | Muto | 375/147 |
| 2007/0002987 | A1 * | 1/2007 | Sinha et al. | 375/354 |

* cited by examiner

*Primary Examiner*—Tesfaldet Bocure
(74) *Attorney, Agent, or Firm*—Bacon & Thomas, PLLC

(57) ABSTRACT

A bit synchronization method and system for a GPS, which receives a satellite signal sent by a satellite to accordingly produce a synchronous signal. Each data bit of the satellite signal consists of N CA-codes. A data buffer receives and stores the data bits of the satellite signal. A matched filter filters the N CA-codes of each data bit in order to compute correlations of the N CA-codes of each data bit, and accordingly output a correlation set corresponding to the data bit, wherein the correlation set has N correlations. A selector selects one with the greatest value from the N correlations and uses the CA-code corresponding to the one with the greatest value as the synchronization signal.

7 Claims, 7 Drawing Sheets

High SNR

US 7,746,918 B2

BIT SYNCHRONIZATION METHOD AND SYSTEM FOR A GPS

BACKGROUND OF THE INVENTION

1. Field of the Invention

The invention relates to the technical field of image processing and, more particularly, to a bit synchronization method and system for a GPS.

2. Description of Related Art

In a global position system (GPS), a data bit to be transmitted is processed by spread spectrum with twenty coarse/acquisition (CA) codes. A receiver receives a satellite signal, and performs a radio-frequency decimation on the satellite signal to obtain an intermediate-frequency (IF) signal. Then, an analog-to-digital converter (ADC) is used to sample the IF signal, and signal processing is employed to obtain the bits of the corresponding source signal for positioning. Even in a low signal-to-noise ratio (SNR) environment, it is required to complete CA synchronization and bit synchronization, so as to be able to complete data demodulation. The purpose of bit synchronization is to provide a receiver with a clock synchronization signal having the best demodulation capability. The accuracy of the synchronization signal is one of the most important parameters to influence the sensitivity of the receiver.

FIG. 1 shows a typical flow of performing bit synchronization using a bar chart. As shown in FIG. 1, the respective transition numbers of twenty CA-codes are counted in an observation time period to accordingly find a start time of correct bit by setting a threshold. As shown in FIG. 2, in a high SNR environment, the CA-code 2 (CA2) has a counted number higher than the high threshold TH_H, and accordingly it is determined that the bit synchronization occurs at CA2. However, as shown in FIG. 3, in a low SNR environment, the probability of CA transition is close to 50%. Thus, the aforementioned statistical bar chart algorithm is likely to cause a detection error, which further causes a failure of signal demodulation. In addition, the prior art requires the accumulation of the statistical samples, so the observation time may significantly increase to result in prolonging the tracking time, slowing down the response of the entire system, and being unable to position fats.

Therefore, it is desirable to provide an improved bit synchronization method and system to mitigate and/or obviate the aforementioned problems.

SUMMARY OF THE INVENTION

The object of the invention is to provide a bit synchronization method and system for a global position system (GPS), which overcomes the problems that the bar chart algorithm cannot effectively be operated for bit synchronization in a low SNR environment and a quick positioning is not obtainable in the prior art.

In accordance with one aspect of the invention, there is provided a bit synchronization system for a global position system (GPS), which receives a satellite signal sent by a satellite to accordingly produce a synchronization signal. Each data bit of the satellite signal consists of N coarse/acquisition (CA) codes, where N is an integer. The system includes a data buffer, a matched filter and a selector. The data buffer receives and stores the data bits of the satellite signal. The matched filter is connected to the data buffer in order to filter the N CA-codes of each data bit and compute correlations of the N CA-codes of each data bit, and accordingly output a correlation set corresponding to the data bit, wherein the correlation set has N correlations. The selector selects a greatest correlation from the correlation set and uses the CA-code corresponding to the greatest correlation as the synchronization signal.

According to another aspect of the invention, there is provided a bit synchronization method for a global position system (GPS), which receives a satellite signal sent by a satellite to accordingly produce a synchronization signal. Each data bit of the satellite signal consists of N coarse/acquisition (CA) codes, where N is an integer. The method includes: a data receiving step, which receives and stores the data bits of the satellite signal; a match filtering step, which filters the N CA-codes of each data bit and computes correlations with the N CA-codes for each data bit to accordingly output a correlation set corresponding to the data bit, wherein the correlation set has N correlations; and a selecting step, which selects a greatest correlation from the correlation set and uses the CA-code corresponding to the greatest correlation as the synchronization signal.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
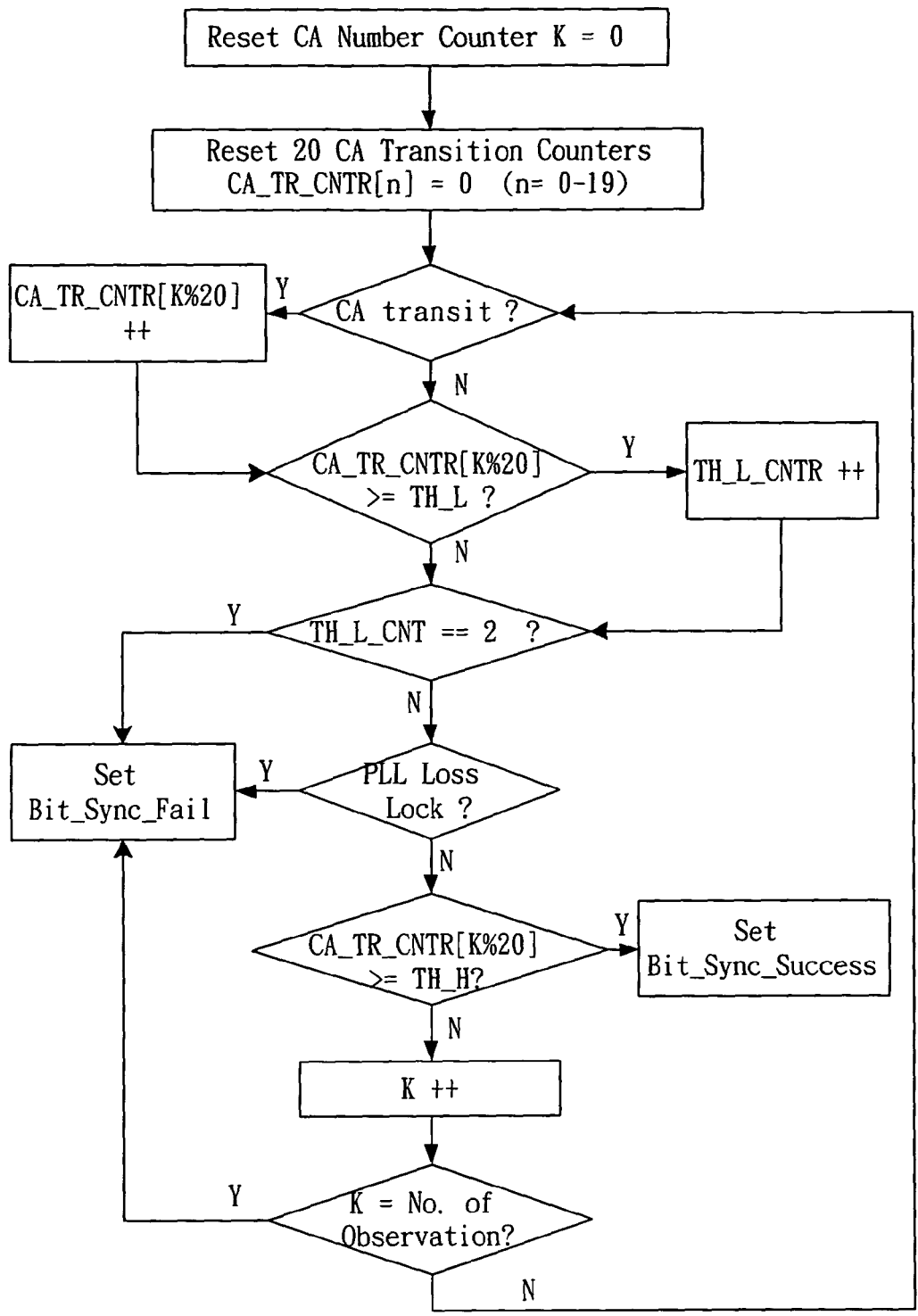
FIG. 1 is a flowchart of performing bit synchronization using a typical bar chart.
Figure 2:
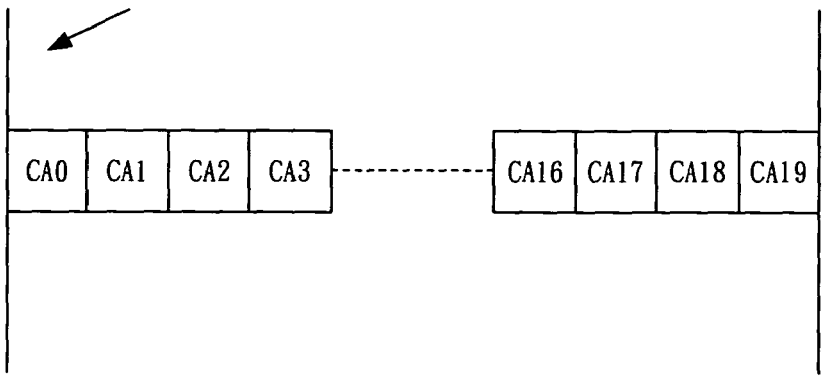
FIG. 2 is a schematic graph of using a typical bar chart in a bit synchronization at a high SNR environment.
Figure 2:
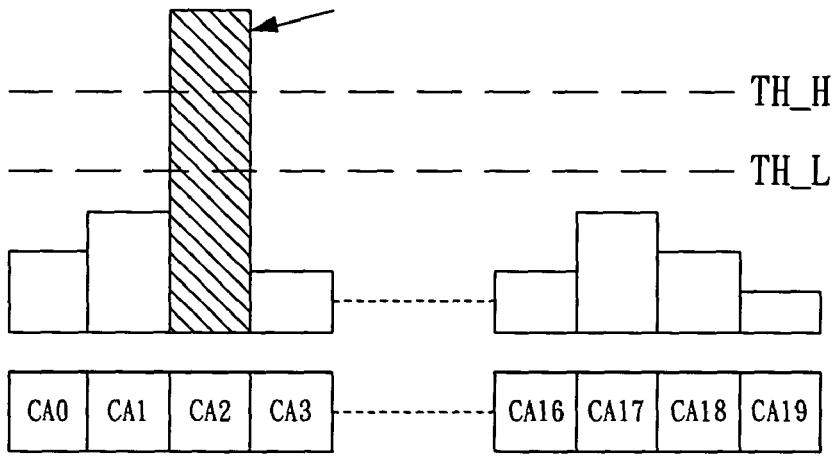
Figure 3:
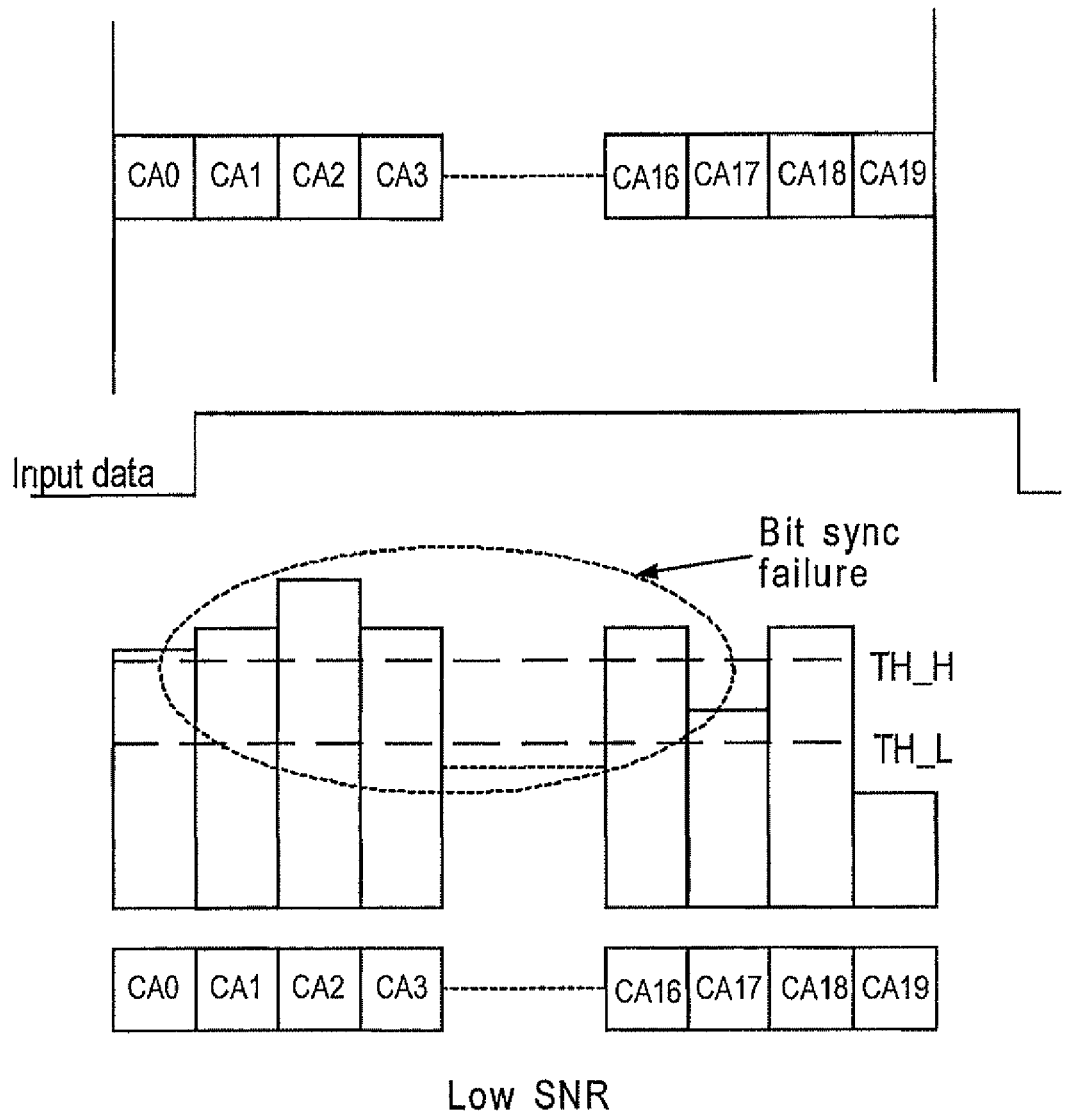
FIG. 3 is a schematic graph of using a typical bar chart in a bit synchronization at a low SNR environment.
Figure 4:
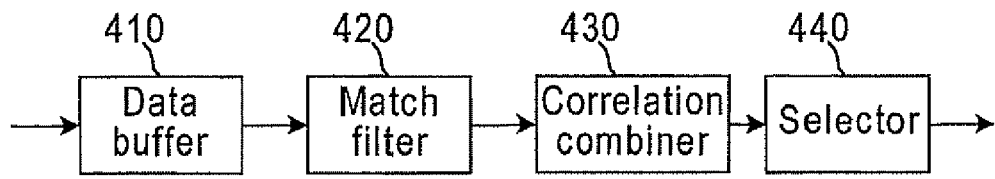
FIG. 4 is a block diagram of a bit synchronous system for a GPS according to the invention.

FIG. 4 is a block diagram of a bit synchronization system for a GPS according to the invention, which receives a satellite signal sent by a satellite to accordingly produce a synchronization signal. Each data bit of the satellite signal consists of N coarse/acquisition (CA) codes, where N is an integer. The system includes a data buffer 410, a matched filter 420, a correlation combiner 430 and a selector 440.

The data buffer 410 receives and stores the data bits of the satellite signal. In this embodiment, three data bits are processed for illustration. Since each data bit has twenty CA-codes, the data buffer 410 has 3*20 bits. A CA-code can be stored in one or more bits, and accordingly the data buffer 410 can be configured in a unit of word.

The matched filter 420 is connected to the data buffer 410 in order to filter the twenty CA-codes for each data bit and compute correlations of the twenty CA-codes for each data bit, and accordingly output a correlation set corresponding to the data bit, wherein the correlation set has 20 correlations.

Figure 5:
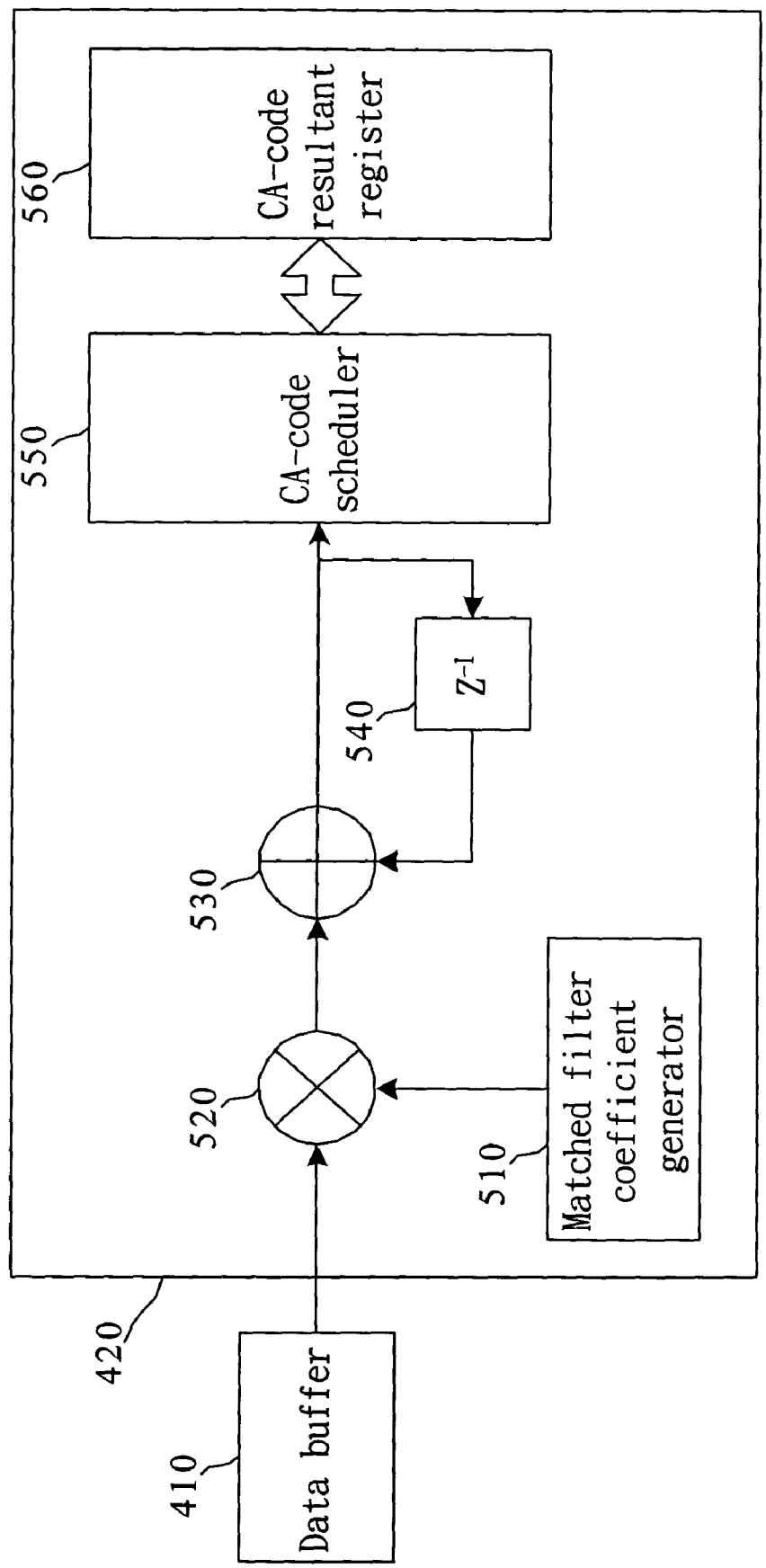
FIG. 5 is a block diagram of a matched filter according to the invention.

FIG. 5 is a block diagram of a matched filter according to the invention. As shown in FIG. 5, the matched filter 420 includes a matched filter coefficient generator 510, a multiplier 520, a first adder 530, a first delay device 540, a CA-code scheduler 550 and a CA-code resultant register 560.

The matched filter coefficient generator 510 generates coefficients of the matched filter 420. The generator 510 can be a non-volatile memory to store coefficients of the twenty CA-codes for use as the coefficients of the matched filter 420. Alternatively, as the coefficients of the matched filter 420 follow a logic feature, the matched filter coefficient generator 510 can be a logic circuit to generate the coefficients of the matched filter 420.

The multiplier 520 has a first terminal connected to the data buffer 410 in order to receive the data bits of the satellite signal, and a second terminal connected to the matched filter coefficient generator 510 in order to multiply a CA-code of the data bits by a coefficient of the matched filter 420 to thus produce a partial correlation corresponding to the CA-code. The multiplication performed by the multiplier 520 is a binary multiplication.

The first adder 530 has a first input terminal connected to the multiplier 520 in order to receive the partial correlation corresponding to the CA-code, a second input terminal to receive a delayed partial correlation in order to accumulate each partial correlation corresponding to the CA-code, and an output terminal to produce the correlation of the CA-code. The first delay device 540 is connected to the output terminal of the first adder 530 in order to temporarily store the output of the adder 530, and produce the delayed partial correlation.

The CA-code scheduler 550 is connected to the first adder 530 in order to send each correlation output by the first adder 530 to a corresponding register location. The CA-code resultant register 560 is connected to the CA-code scheduler 550 in order to store the correlations of the twenty CA-codes temporarily.

Figure 6:
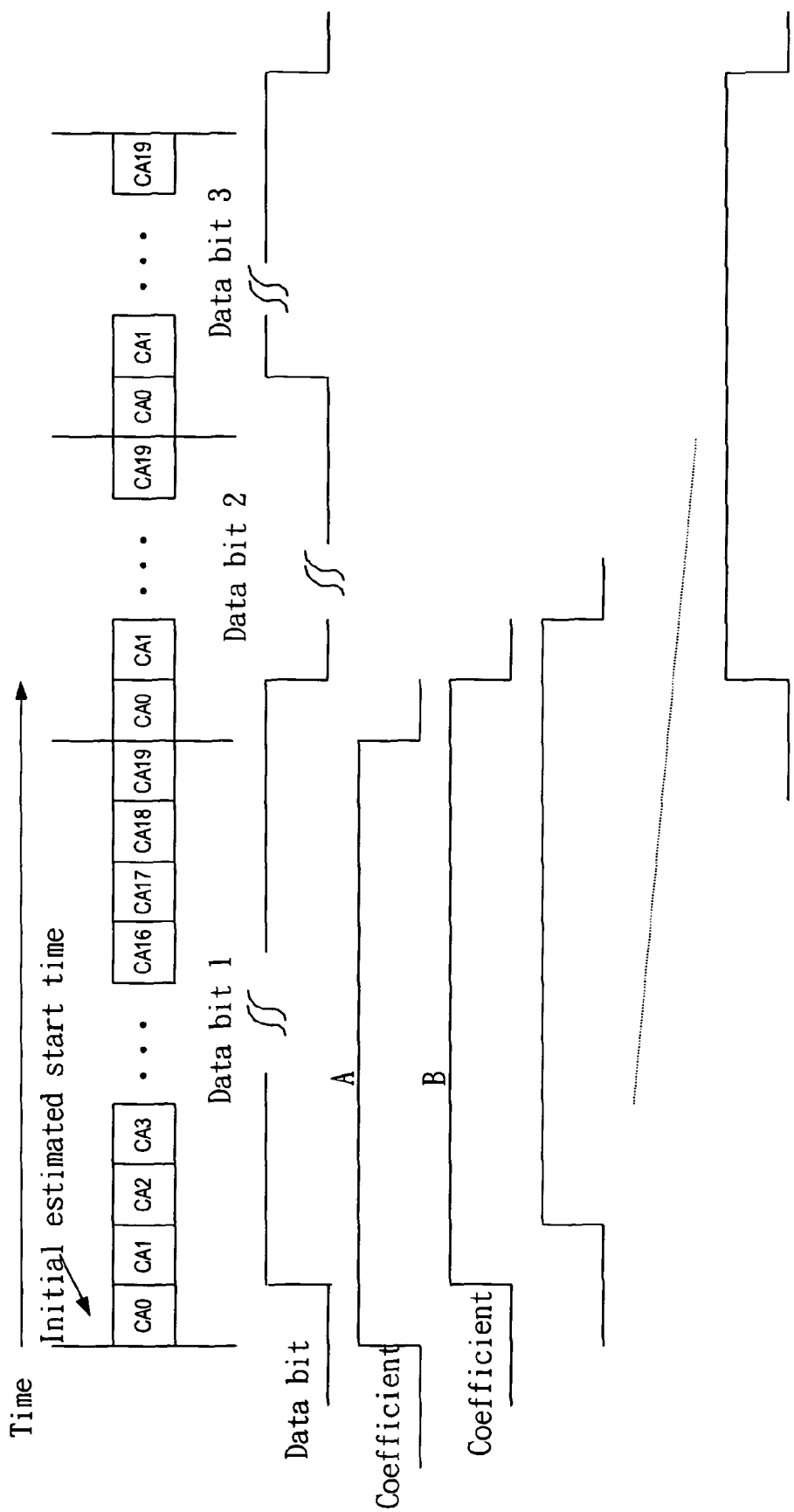
FIG. 6 is a schematic graph of an operation of FIG. 5 according to the invention.

FIG. 6 is a schematic graph of an operation of the matched filter 420 according to the invention. As shown in FIG. 6, for computing the correlation of CA-code 0 (CA0), a data bit corresponding to the CA-code 0 is multiplied by a coefficient, which is denoted by A in FIG. 6, of the matched filter. The correlation of CA0 produced is temporarily stored in the CA-code resultant register 560 through the CA-code scheduler 550. Next, for computing the correlation of CA-code 1 (CA1), the data bit is multiplied by a coefficient, which is denoted by B in FIG. 6, of the matched filter. Accordingly, when the correlations of the CA-codes 0 to 19 are computed completely, the CA-code resultant register 560 stores the twenty correlations and thus outputs a correlation set containing the twenty correlations corresponding to the data bit.

The correlation combiner 430 is connected to the matched filter 420 in order to combine a plurality of correlation sets to thus produce a combined correlation by adding N correlations corresponding to the plurality of correlation sets.

Figure 7:
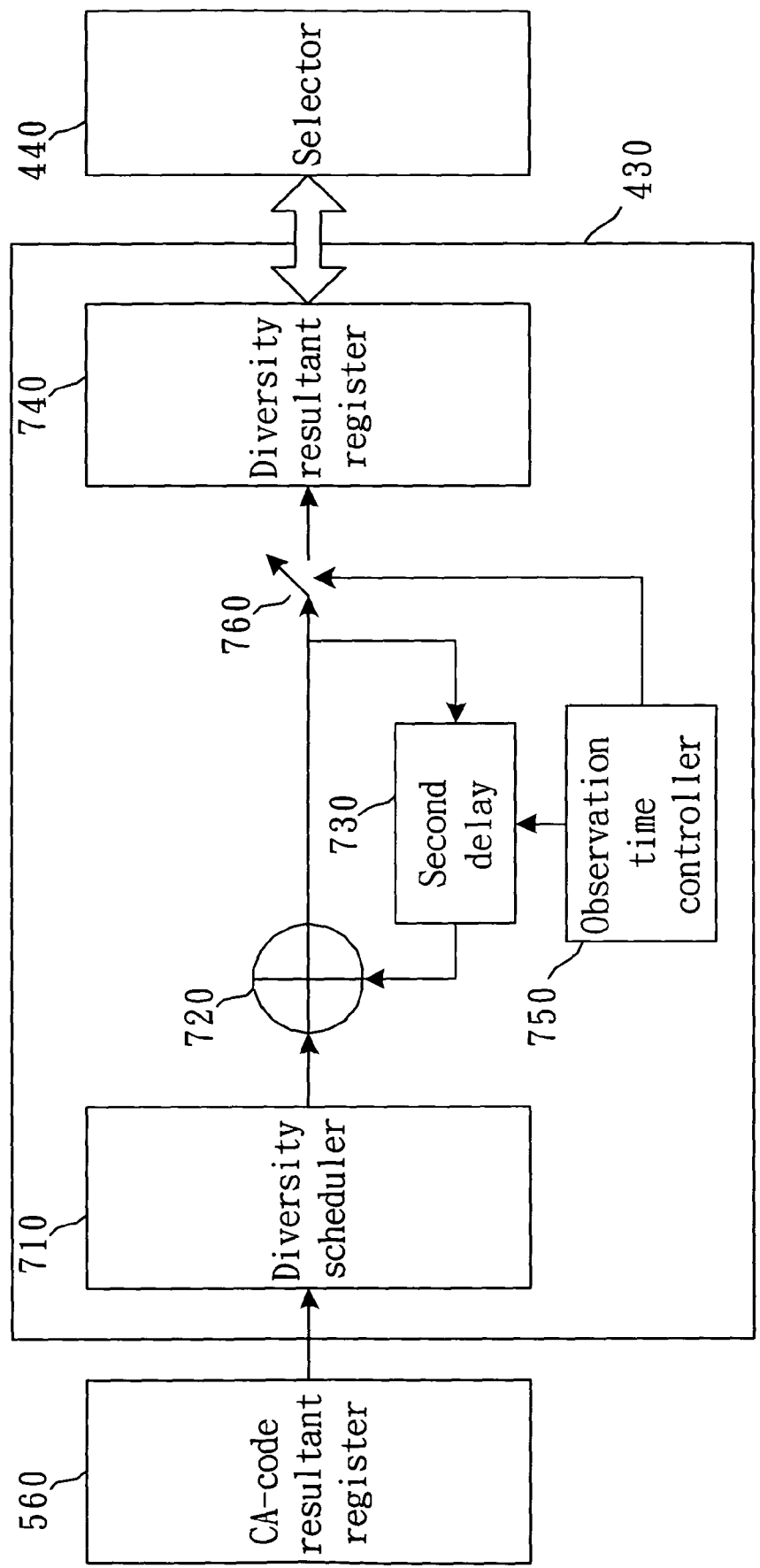
FIG. 7 is a block diagram of a correlation combiner according to the invention.

FIG. 7 is a block diagram of the correlation combiner 430 according to the invention. The correlation combiner 430 essentially computes the correlations of CA-codes 0 to 19 in a diversity. In this embodiment, a diversity contains three data bits. As shown in FIG. 7, the correlation combiner 430 includes a diversity scheduler 710, a second adder 720, a second delay device 730, a diversity resultant register 740, an observation time controller 750 and a switch 760.

The diversity scheduler 710 is connected to the CA-code resultant register 560 in order to fetch the correlations temporarily stored in the CA-code resultant register 560. The second adder 720 is connected to the diversity scheduler 710 in order to accumulate the correlations fetched by the diversity scheduler 710 to thus obtain an accumulated result, and temporarily stores the accumulated result in the diversity register 740. For example, the three correlations corresponding to the respective CA-codes 0 of the three data bits are added and temporarily stored in a first storage location of the diversity resultant register 740.

In this case, the correlation combiner 430 accumulates the energy of a diversity (three data bits). When the energies of multiple diversities are to be accumulated, the observation time controller 750 can be used to control the second delay device 730 and the switch 760. For example, if the energies of five diversities are to be accumulated, the observation time controller 750 enables the second delay device 730 and the switch 760 for a period of five diversities to thereby allow the diversity resultant register 740 to accumulate the energies of the five diversities.

The selector 440 is connected to the diversity resultant register 740 in order to select a greatest correlation from the N correlations stored in the diversity resultant register 740 and the CA-code corresponding to the greatest correlation is used as the synchronization signal.

This embodiment computes the correlations of CA-codes 0 to 19 in a diversity, and the diversity contains three data bits, as cited above. Accordingly, the selector 440 is connected to the correlation combiner 430. However, in other embodiments, if a diversity contains a data bit, the selector 440 can be connected to the matched filter 420 directly to select a greatest correlation from the N correlations stored in the CA-code resultant register 560 and the CA-code corresponding to the greatest correlation is used as the synchronization signal.

Figure 8:
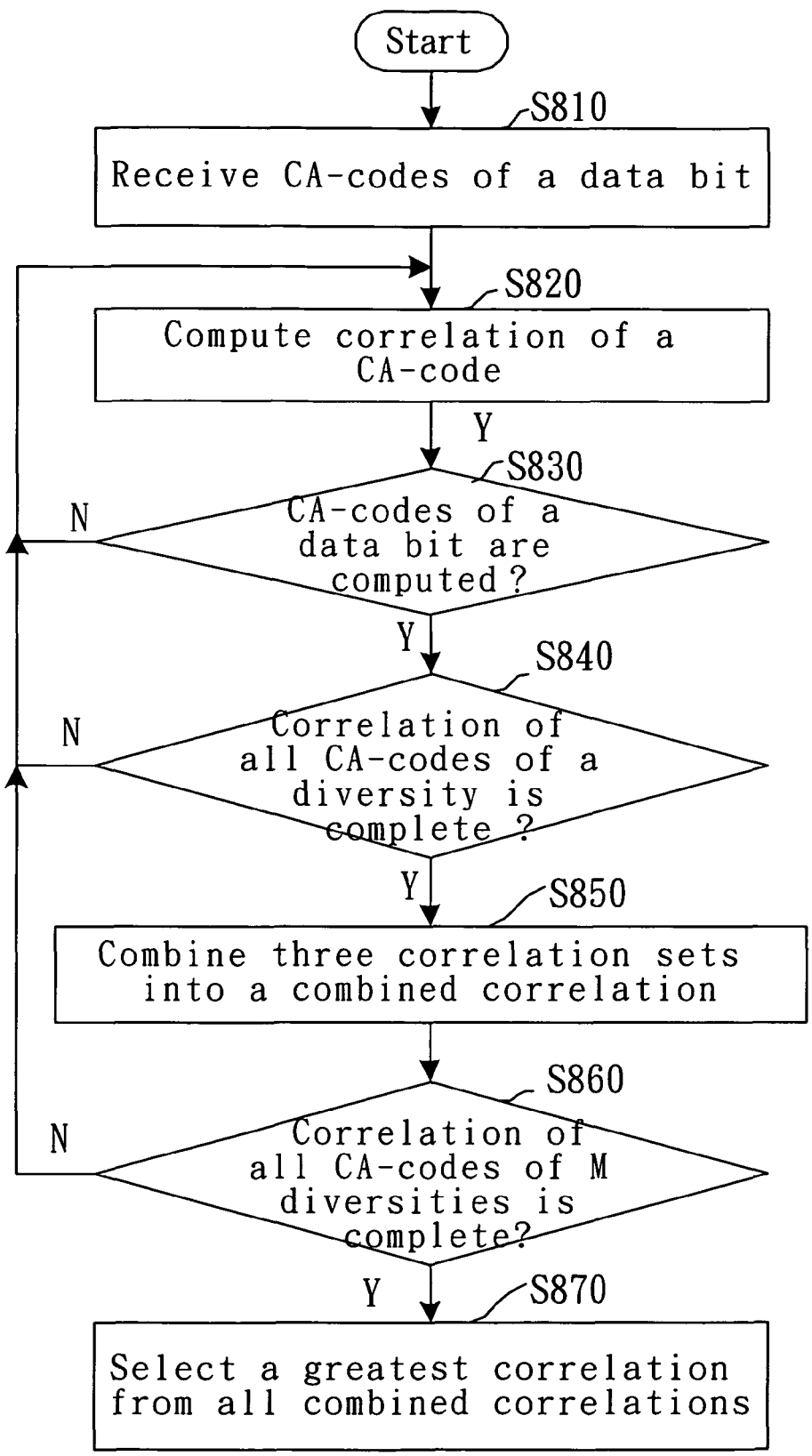
FIG. 8 is a flowchart of a bit synchronization method for a GPS according to the invention.

FIG. 8 is a flowchart of a bit synchronization method for a GPS according to the invention. As shown in FIG. 8, step S810 receives the twenty CA-codes of a data bit. Step S820 computes a correlation corresponding to a CA-code of the data bit by multiplying the CA-code of the data bit by a coefficient of a matched filter, to thus produce the correlation corresponding to the CA-code. Step S830 determines if the 20 CA-codes of the data bit are computed completely; if yes, step S840 is executed; otherwise, step S820 is executed.

After the correlations with the twenty CA-codes of the data bit are computed completely and formed as a correlation set, step S840 further determines if correlation computation with all CA-codes of three data bits of a diversity is complete; if yes, step S850 is executed; otherwise, step S820 is executed to perform a correlation computation on twenty CA-codes of a next data bit.

After three correlation sets are formed, step S850 combines the three correlation sets into a combined correlation. Step S860 determines if correlation computation of all data bits of M diversities is complete; if yes, step S870 is executed; otherwise, step S820 is executed to perform the correlation computation on twenty CA-codes of a data bit of a next diversity. Step S870 selects a greatest correlation from the combined correlations and uses the greatest correlation as the synchronization signal.

In view of the foregoing, it is known that the invention uses the matched filter to compute the correlations of twenty CA-codes of a data bit, which can be achieved by simple hardware to thus obtain a real-time effect and further overcome the prior problems that the bar chart algorithm cannot effectively be operated for bit synchronization in a low SNR environment and a quick positioning is not obtainable.

Although the present invention has been explained in relation to its preferred embodiment, it is to be understood that many other possible modifications and variations can be made without departing from the spirit and scope of the invention as hereinafter claimed.

What is claimed is:

1. A bit synchronization system for a global position system (GPS), which receives a satellite signal sent by a satellite to accordingly produce a synchronization signal, each data bit of the satellite signal consisting of N coarse/acquisition (CA) codes (CA-codes), where N is an integer, the system comprising:

a data buffer, which receives and stores the data bits of the satellite signal;

a matched filter, which is connected to the data buffer in order to filter the N CA-codes of each data bit and compute correlations with the N CA-codes of each data bit, and accordingly output a correlation set corresponding to the data bit;

a selector, which selects a greatest correlation from the correlation set and uses the CA-code corresponding to the greatest correlation as the synchronization signal; and a correlation combiner, which is connected to the matched filter in order to combine multiple correlation sets into a combined correlation;

wherein the correlation combiner respectively adds up corresponding N correlations of the correlation sets.

2. The system as claimed in claim 1, wherein the matched filter comprises:

a matched filter coefficient generator, which generates coefficients of the matched filter;

a multiplier, which has a first terminal connected to the data buffer in order to receive the data bits of the satellite signal and a second terminal connected to the matched filter coefficient generator in order to perform a multiplication operation on a data bit and a coefficient of the matched filter to thus produce a partial correlation corresponding to the CA-code of the data bit;

an adder, which has a first input terminal connected to the multiplier in order to receive the partial correlation, a second input terminal to receive a delayed partial correlation for being added to the partial correlation, and an output terminal to produce the correlation of CA-code; and a delay device, which is connected to the output terminal of the adder in order to temporarily store an output of the adder, and produce the delayed partial correlation.

3. The system as claimed in claim 2, wherein the multiplication operation is a binary multiplication operation.

4. The system as claimed in claim 1, wherein the matched filter further comprises:

a CA-code scheduler, which is connected to the adder in order to send the correlation of the CA-code output by the adder to a corresponding register location; and a CA-code resultant register, which is connected to the CA-code scheduler in order to register the correlations of N CA-codes.

5. The system as claimed in claim 1, wherein N is equal to 20.

6. A bit synchronization method for a global position system (GPS), which receives a satellite signal sent by a satellite to accordingly produce a synchronization signal, each data bit of the satellite signal consisting of N coarse/acquisition (CA) codes (CA-codes), where N is an integer, the method comprising:

a data receiving step, which receives and stores the data bits of the satellite signal;

a match filtering step, which filters the N CA-codes of each data bit and computes correlations with the N CA-codes of each data bit to accordingly output a correlation set corresponding to the data bit, wherein the correlation set has N correlations;

a selecting step, which selects a greatest correlation from the correlation set and uses the CA-code corresponding to the greatest correlation as the synchronization signal; and a correlation combining step, which combines multiple correlation sets into a combined correlation;

wherein the correlation combining step respectively adds up the N correlations with each of correlation sets.

7. The method as claimed in claim 6, wherein N is equal to 20.

* * * * *